United States Patent
Manela

(10) Patent No.: US 10,749,607 B2
(45) Date of Patent: Aug. 18, 2020

(54) INTEGRATED INFRA-RED RECEIVER AND LOW/HIGH-FREQUENCY RECEIVER IN PORTABLE TRANSPONDER DEVICE

(71) Applicant: Tyco Fire & Security GmbH, Neuhausen am Rheinfall (CH)

(72) Inventor: Avi Manela, Hod Hasharon (IL)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 15/642,596

(22) Filed: Jul. 6, 2017

(65) Prior Publication Data
US 2019/0013877 A1    Jan. 10, 2019

(51) Int. Cl.
H04B 10/114    (2013.01)
H04B 10/11    (2013.01)
H04B 10/69    (2013.01)

(52) U.S. Cl.
CPC ....... *H04B 10/6911* (2013.01); *H04B 10/114* (2013.01); *H04B 10/1141* (2013.01); *H04B 10/11* (2013.01)

(58) Field of Classification Search
None
See application file for complete search history.

(56) References Cited

U.S. PATENT DOCUMENTS

| | | | | |
|---|---|---|---|---|
| 4,904,993 A * | 2/1990 | Sato | .................. | G07C 9/00182 340/12.5 |
| 5,062,151 A * | 10/1991 | Shipley | ................ | H04B 10/116 398/108 |
| 5,483,367 A * | 1/1996 | Han | ...................... | H04B 10/114 381/2 |
| 5,526,161 A * | 6/1996 | Suzuki | ............... | H04B 10/1143 398/118 |
| 5,602,669 A * | 2/1997 | Chaki | .................. | H04B 10/114 398/188 |
| 5,850,189 A * | 12/1998 | Sakanaka | ........... | H04B 10/1143 340/12.22 |
| 5,917,425 A * | 6/1999 | Crimmins | ................. | G01S 1/70 340/5.81 |
| 5,946,120 A * | 8/1999 | Chen | ...................... | H04B 10/11 370/277 |
| 5,999,294 A * | 12/1999 | Petsko | ............... | H04B 10/1143 398/115 |

(Continued)

OTHER PUBLICATIONS

Sattel, Sam, How RFID Works & Antenna Design, 2016, https://www.autodesk.com/products/eagle/blog/rfid-works-antenna-design, pp. 1-8.*

(Continued)

*Primary Examiner* — Jai M Lee
(74) *Attorney, Agent, or Firm* — Arent Fox LLP

(57) ABSTRACT

A portable transponder device including a receiver having an input frequency range of either but not both of 20 kHz-300 kHz and 3 MHz-30 MHz, the receiver having a plurality of signal input channels, the input frequency range not including an infra-red frequency range, and infra-red frequency range receiving circuitry receiving infra-red frequency range signals modulated by at least one signal in the input frequency range, and providing the infra-red frequency range signals to the receiver through at least one signal input channel of the plurality of signal input channels.

24 Claims, 5 Drawing Sheets

(56) References Cited

U.S. PATENT DOCUMENTS

| | | | | |
|---|---|---|---|---|
| 6,282,407 B1* | 8/2001 | Vega | G06K 7/10435 | 455/41.1 |
| 6,323,566 B1* | 11/2001 | Meier | G07C 9/00309 | 307/10.2 |
| 6,400,480 B1* | 6/2002 | Thomas | G08C 17/02 | 398/106 |
| 6,570,524 B1* | 5/2003 | Mullaly | G08C 23/04 | 340/12.22 |
| 6,754,451 B1* | 6/2004 | Nakamura | H04B 10/1143 | 398/135 |
| 6,763,195 B1* | 7/2004 | Willebrand | H04B 10/1123 | 398/115 |
| 7,100,052 B2* | 8/2006 | Ghazarian | G06K 7/0008 | 713/182 |
| 8,139,942 B2* | 3/2012 | Tsurumoto | G08C 17/02 | 340/10.1 |
| 9,219,984 B1* | 12/2015 | Amir | H04W 4/021 | |
| 9,747,480 B2* | 8/2017 | McAllister | G06K 7/10376 | |
| 2002/0122230 A1* | 9/2002 | Izadpanah | H04B 10/1121 | 398/115 |
| 2002/0145534 A1* | 10/2002 | Dempsey | G01S 5/0252 | 340/8.1 |
| 2003/0218532 A1* | 11/2003 | Hussmann | H04L 63/0853 | 340/5.8 |
| 2005/0145187 A1* | 7/2005 | Gray | A01K 11/008 | 119/174 |
| 2007/0159331 A1* | 7/2007 | Zegelin | G06K 19/0701 | 340/572.1 |
| 2007/0229269 A1* | 10/2007 | Morris | G06K 7/0008 | 340/572.1 |
| 2008/0240722 A1* | 10/2008 | Karaki | H04B 10/2575 | 398/115 |
| 2009/0208221 A1* | 8/2009 | Sasai | H04B 1/707 | 398/130 |
| 2011/0285511 A1* | 11/2011 | Maguire | G06K 19/0724 | 340/10.1 |
| 2013/0122807 A1* | 5/2013 | Tenarvitz | G16H 40/20 | 455/41.1 |
| 2014/0218165 A1* | 8/2014 | Johnson | G07C 9/00857 | 340/5.25 |
| 2015/0146879 A1* | 5/2015 | Nguyen | H04N 21/43615 | 381/74 |
| 2017/0372538 A1* | 12/2017 | Zhevelev | G07C 9/00309 | |
| 2018/0182192 A1* | 6/2018 | Amir | G07C 9/00111 | |

OTHER PUBLICATIONS

Lau, Kam Y., Ultra-high Frequency Linear Fiber Optic Systems, 2009, pp. 177-178.*

Pfeifer et al., Commercial Hybrid IR/RF Local Positioning System, 2003 (Year: 2003).*

* cited by examiner

INTEGRATED INFRA-RED RECEIVER AND LOW/HIGH-FREQUENCY RECEIVER IN PORTABLE TRANSPONDER DEVICE

FIELD OF THE INVENTION

The present invention relates generally to real time location systems and particularly to transponder devices for use therein.

BACKGROUND OF THE INVENTION

Various types of real time location systems including portable transponder devices are known.

SUMMARY OF THE INVENTION

The present invention seeks to provide improved transponder devices having integrated infra-red and low-frequency or high-frequency signal receiving functionalities, and systems and methods relating to use thereof.

There is thus provided in accordance with a preferred embodiment of the present invention a portable transponder device including a receiver having an input frequency range of either but not both of 20 kHz-300 kHz and 3 MHz-30 MHz, the receiver having a plurality of signal input channels, the input frequency range not including an infra-red frequency range and infra-red frequency range receiving circuitry receiving infra-red frequency range signals modulated by at least one signal in the input frequency range, and providing the infra-red frequency range signals to the receiver through at least one signal input channel of the plurality of signal input channels.

Preferably, the infra-red frequency range signals are at least one of frequency modulated and amplitude modulated by the at least one signal in the input frequency range.

In accordance with a preferred embodiment of the present invention, the infra-red frequency range receiving circuitry includes at least one photodiode.

Preferably, the infra-red frequency range receiving circuitry also includes an electrical load connected to the at least one photodiode.

Preferably, the electrical load includes a resonance circuit connected to the at least one photodiode.

In accordance with another preferred embodiment of the present invention, the receiver is in a constantly on, signal-receiving state.

There is also provided in accordance with another preferred embodiment of the present invention a real time location system including at least one of a first multiplicity of transmitters located on a premises for transmitting signals in a transmission frequency range of either but not both of 20 kHz-300 kHz and 3 MHz-30 MHz and a second multiplicity of infra-red frequency range transmitters located on the premises for transmitting infra-red frequency range signals modulated by at least one signal in the transmission frequency range, the transmission frequency range not including the infra-red frequency range and at least one portable wireless transponder device associated with an entity located within the premises, the portable wireless transponder device including a receiver having a plurality of signal input channels for receiving the signals transmitted by the first multiplicity of transmitters, and infra-red frequency range receiving circuitry receiving the infra-red frequency range signals transmitted by the second multiplicity of infra-red frequency range transmitters and providing the infra-red frequency range signals to the receiver through at least one signal input channel of the plurality of signal input channels.

Preferably, the infra-red frequency range signals are at least one of frequency modulated and amplitude modulated by the at least one signal in the transmission frequency range.

In accordance with a preferred embodiment of the present invention, the infra-red frequency range receiving circuitry includes at least one photodiode.

Preferably, the infra-red frequency range receiving circuitry also includes an electrical load connected to the at least one photodiode.

Preferably, the electrical load includes a resonance circuit connected to the at least one photodiode.

In accordance with another preferred embodiment of the present invention, the receiver is in a constantly on, signal-receiving state.

Preferably, the first multiplicity of transmitters transmits intermittently.

Preferably, the first multiplicity of transmitters transmits every few milliseconds.

Preferably, the first multiplicity of transmitters is battery powered.

Additionally or alternatively, the second multiplicity of infra-red transmitters transmits intermittently.

Preferably, the second multiplicity of infra-red transmitters transmits every few seconds.

Preferably, the second multiplicity of infra-red transmitters is battery powered.

There is further provided in accordance with yet another preferred embodiment of the present invention a method for receipt of signals by a portable transponder device including receiving, by a receiver in a portable transponder device, signals in an input frequency range of either but not both of 20 kHz-300 kHz and 3 MHz-30 MHz, the input frequency range not including an infra-red frequency range, receiving, by infra-red frequency range receiving circuitry, infra-red frequency range signals modulated by at least one signal in the input frequency range; and providing the infra-red frequency range signals to the receiver through at least one signal input channel of the receiver.

Preferably, the receiving by the receiver and the receiving by the infra-red frequency range receiving circuitry is performed continuously.

BRIEF DESCRIPTION OF THE DRAWINGS

The present invention will be understood and appreciated more fully based on the following detailed description taken in conjunction with the drawings in which.

DETAILED DESCRIPTION OF PREFERRED EMBODIMENTS

Figure 1:
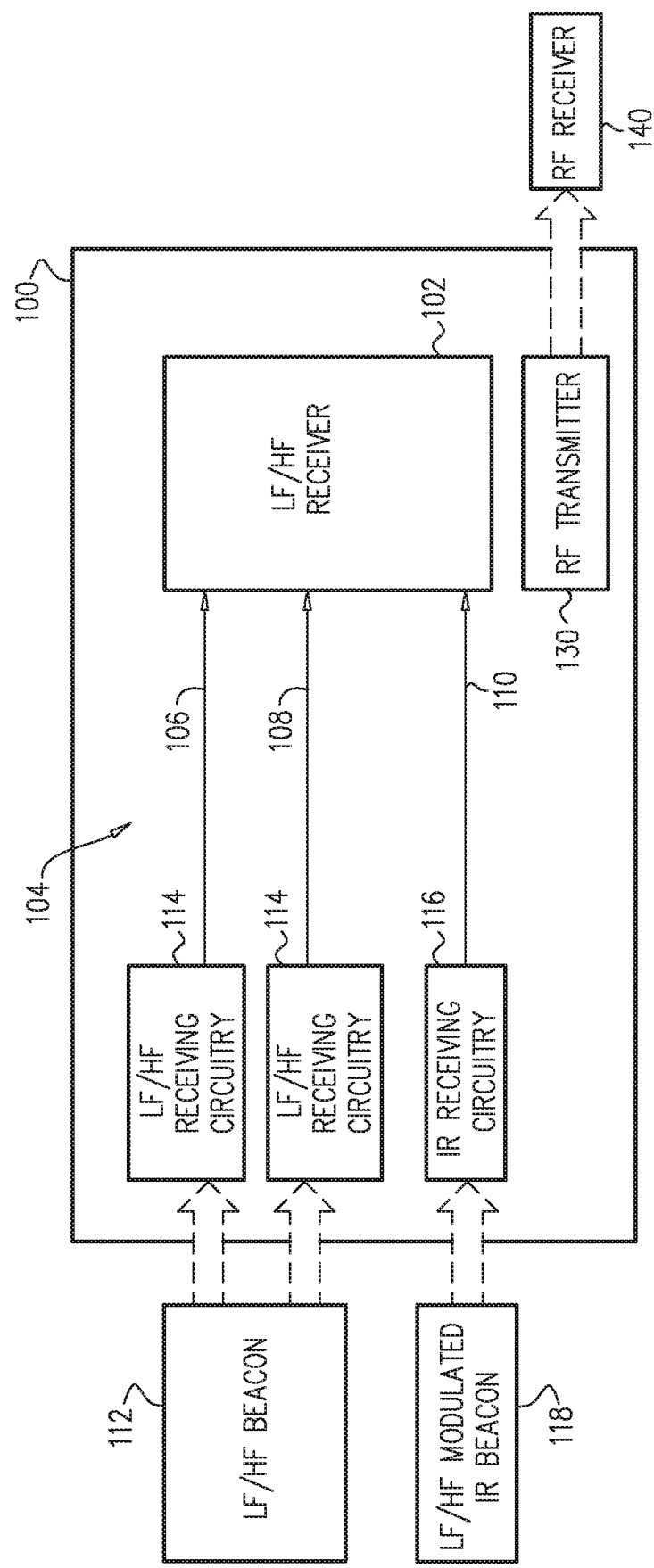
FIG. 1 is a simplified schematic block diagram illustration of a system including a transponder device, constructed and operative in accordance with a preferred embodiment of the present invention.

Reference is now made to FIG. 1, which is a simplified schematic block diagram illustration of a system including a transponder device, constructed and operative in accordance with a preferred embodiment of the present invention.

As seen in FIG. 1, there is provided a transponder device 100, which transponder device 100 is preferably a portable, wireless device associated with an entity, such as a person or item, located within a premises. Particularly preferably, transponder device 100X) is a tag forming a part of a real time location system (RTLS) facilitating tracking of transponder device 100, and hence of the entity with which transponder device 100 is associated, within a premises. Such tracking may be based on communication between transponder device 100 and transmitters and/or receivers within the premises, as is explained in greater detail henceforth. Transponder device 100 may be embodied as a wrist tag, asset tag, personal badge, lone worker tag, baby tag or any other tag, various types of which are well known in the art.

Transponder device 100 preferably includes a receiver 102 having an input frequency range of either but not both of (20 kHz-300 kHz) and (3 MHz-30 MHz). The receiver input frequency range of 20 kHz-300 kHz preferably corresponds to the low-frequency (LF) band of the radio frequency spectrum. The receiver input frequency range of 3 MHz-30 MHz preferably corresponds to the high-frequency (HF) band of the radio frequency spectrum. Receiver 102 may operate as an LF radio frequency receiver, receiving signals in the LF 20 kHz-300 kHz range or as an HF radio frequency receiver, receiving signals in the HF 3 MHz-30 MHz range. Receiver 102 may hence be termed an LF/HF receiver 102, as indicated in FIG. 1. It is understood that the input frequency range of receiver 102 does not include an infra-red frequency range.

Particularly preferably, receiver 102 may be configured and operative for receiving LF signals at approximately 125 kHz. Alternatively, receiver 102 may be configured and operative for receiving HF signals at approximately 13.56 MHz.

Receiver 102 preferably has a plurality of signal input channels 104. Here, by way of example, plurality of input channels 104 is seen to comprise a first input channel 106, a second input channel 108 and a third input channel 110, as is typically the case in conventional transponder devices. It is appreciated, however, that plurality of input channels 104 may comprise a greater or fewer number of input channels than illustrated here, depending on the operating requirements of transponder device 100.

Receiver 102 is preferably configured and operable for receiving LF or HF signals transmitted by at least one LF or HF beacon 112 located on a premises. Beacon 112 may transmit LF signals in a transmission frequency range of 20 kHz-300 kHz or may transmit HF signals in a transmission frequency range of 3 MHz-30 MHz. Beacon 112 may hence be termed an LF/HF beacon, as indicated in FIG. 1. LF or HF signals transmitted by LF/HF beacon 112 are preferably received by corresponding LF or HF receiving circuitry 114 associated with at least one channel of plurality of input channels 104. Here, by way of example, LF/HF receiving circuitry 114 is seen to be located on first input channel 106 and second input channel 108. LF/HF receiving circuitry 114 may, by way of example, comprise one or more antennas, coils or transponders for receiving either LF or HF radio frequency signals, as is detailed henceforth.

An RTLS may include a multiplicity of LF or HF transmitters, such as LF/HF beacon 112, preferably mounted at a corresponding multiplicity of exit locations in a premises, for exit identification of an entity with which transponder 100 is associated, by way of either an LF or HF link between LF/HF transmitter 112 and receiver 102.

Each LF or HF transmitter preferably transmits signals having a unique ID associated therewith. The ID preferably identifies the specific LF or HF transmitter and the location thereof. LF/HF receiving circuitry 114 preferably receives the LF or HF signal, including the unique ID, and provides the signal to the receiver 102, preferably in the form of a varying voltage. The signal is then preferably processed by a processor such as an MCU (not shown) and the LF/HF transmitter ID extracted. The LF/HF transmitter ID in combination with the ID of the transponder device 100 receiving the LF/HF signal, enables the RTLS to ascertain the location of the transponder device 100 receiving the LF or HF radiation, as is further detailed henceforth.

Transponder device 100 further preferably includes infra-red (IR) frequency range receiving circuitry 116, to facilitate the receipt of infra-red signals by transponder device 100, in addition to the receipt of LF or HF signals. It is a particular feature of a preferred embodiment of the present invention that infra-red receiving circuitry 116 is implemented on at least one channel of plurality of input channels 104 of receiver 102, thus advantageously allowing receiver 102 to act as a receiver for IR signals in addition to LF or HF radio frequency signals. Here, by way of example, IR receiving circuitry 116 is seen to be implemented on a single channel, namely third channel 110, of plurality of input channels 104 of LF/HF receiver 102. It is understood, however, that IR receiving circuitry 116 may be implemented on one or more than one input channel of LF/HF receiver 102 in parallel with one or more LF/HF receiving channels.

IR receiving circuitry 116 is preferably configured and operable for receiving IR signals transmitted by at least one IR transmitter, such as an IR beacon 118 located on a premises. An RTLS may include a multiplicity of IR transmitters such as IR beacon 118, positioned in a corresponding multiplicity of rooms in a premises, for ascertaining room location of the entity with which transponder device 100 is associated, by way of an IR link between IR beacon 118 and IR receiving circuitry 116.

In accordance with a particularly preferred embodiment of the present invention, IR receiving circuitry 116 is preferably configured and operable for receiving IR frequency range signals from IR beacon 118, which IR frequency range signals are preferably modulated by at least one signal in the input frequency range of receiver 102. IR signals transmitted by IR beacon 118 may be frequency- or amplitude-modulated using at least one signal in the input frequency range of receiver 102. By way of example, IR signals transmitted by IR beacon 118 may be modulated by a 125 kHz signal when receiver 102 is operating as an LF receiver, or may be modulated by a 13.56 MHz signal in the case that receiver 102 is operating as an HF receiver.

Each IR transmitter preferably transmits IR signals having a unique ID associated therewith. The ID preferably identifies the specific IR transmitter and the location thereof. IR receiving circuitry 116 preferably receives the modulated IR signal and provides the modulated IR signal to receiver 102, through the at least one input channel, such as channel 110, upon which IR receiving circuitry 116 is located. Preferably, IR receiving circuitry 116 extracts IR data which has been directly modulated by the LF or HF modulating signal and provides the extracted IR data to the receiver 102. The extracted IR data preferably relates to the particular ID of the IR beacon 118 from which the IR signal has been received. The extracted IR data is preferably provided to the receiver 102 in the form of a varying voltage, which varying voltage is preferably processed by a processor.

The extracted IR transmitter ID in combination with the ID of the transponder device 100 receiving the IR signal, enables the RTLS to ascertain the location of the transponder device 100 receiving the IR radiation, as is further detailed henceforth.

The implementation of IR receiving circuitry 116 on a channel of LF/HF receiver 102 allows LF or HF data in addition to IR data, which IR data has been modulated by an LF or HF signal, to be received and processed by a single receiver, namely receiver 102. This is in contrast to conventional transponder devices, which typically require separate IR and LF/HF receivers.

The recruitment of LF/HF receiver 102 for IR reception gives rise to several significant advantages in the operation of transponder device 100. Transponder device 100 is relatively inexpensive to manufacture, due to the dual use of receiver 102, thus obviating the need for a separate IR receiver module. Furthermore, the power consumption by transponder device 100 is significantly reduced, leading to longer battery life and lower operating costs.

Receiver 102 and IR receiving circuitry 116 are preferably, although not necessarily, in a constantly 'on' state, capable of respectively receiving either LF or HF signals as well as IR signals respectively at any time. As a result, the at least one LF/HF beacon 112 and IR beacon 118 in operative communication with receiver 102 and IR receiving circuitry 116 respectively, need not transmit constantly but rather may transmit on an intermittent basis. Such intermittent transmission may be on a regularly periodic basis or on a random basis.

The intermittent rather than continuous transmission by LF/HF and IR beacons 112, 118 considerably reduces the power consumption thereof, allowing one or both of beacon 112 and IR beacon 118 to be embodied as battery-powered devices. This is contrast to conventional RTLS systems in which one or both of LF/HF transmitters and IR transmitters therein are typically required to be implemented as wired elements powered by a mains power supply, in order to support continuous transmission operation thereof.

The optional implementation of at least one of LF/HF and IR beacons 112, 118 as battery powered devices which do not require a mains power supply is a highly advantageous feature of a preferred embodiment of the present invention. It is appreciated that, depending on system requirements, neither, one or both of LF/HF and IR beacons 112, 118 may be implemented as battery-powered devices.

The periodicity with which LF/HF and/or IR beacons 112, 118 respectively transmit may be set in accordance with desired system operating characteristics or may be random. It is understood that more frequent transmission allows faster and more accurate identification of the location of transponder device, but at the expense of greater power uptake and hence reduced battery life. Generally, a periodicity of transmission may be selected based on an optimization of tracking speed and accuracy versus battery lifetime. By way of example, LF/HF transmitter 112 may be configured to transmit every few milliseconds and IR transmitter 118 may be configured to transmit every few seconds.

Transponder device 100 further preferably includes an RF transmitter 130, for transmitting RF signals to an external RF receiver 140 located on the premises. RF transmitter 130 preferably receives the extracted IR and LF/HF beacon IDs, preferably from a processor connected to the receiver 102. RF transmitter 130 preferably wirelessly transmits the beacon ID together with the ID of the transponder device 100 itself to the external RF receiver 140, so as to allow the RTLS to identify the location of the transponder device 100 within the premises.

It is understood that, for the sake of simplicity and clarity of description, transponder device 100 is illustrated in FIG. 1 in a highly simplified form, in which only relevant components thereof are shown. In actuality, transponder device 100 preferably includes a variety of components in addition to those shown, as are well known in the art, including a battery, processor and other components.

Figure 2:
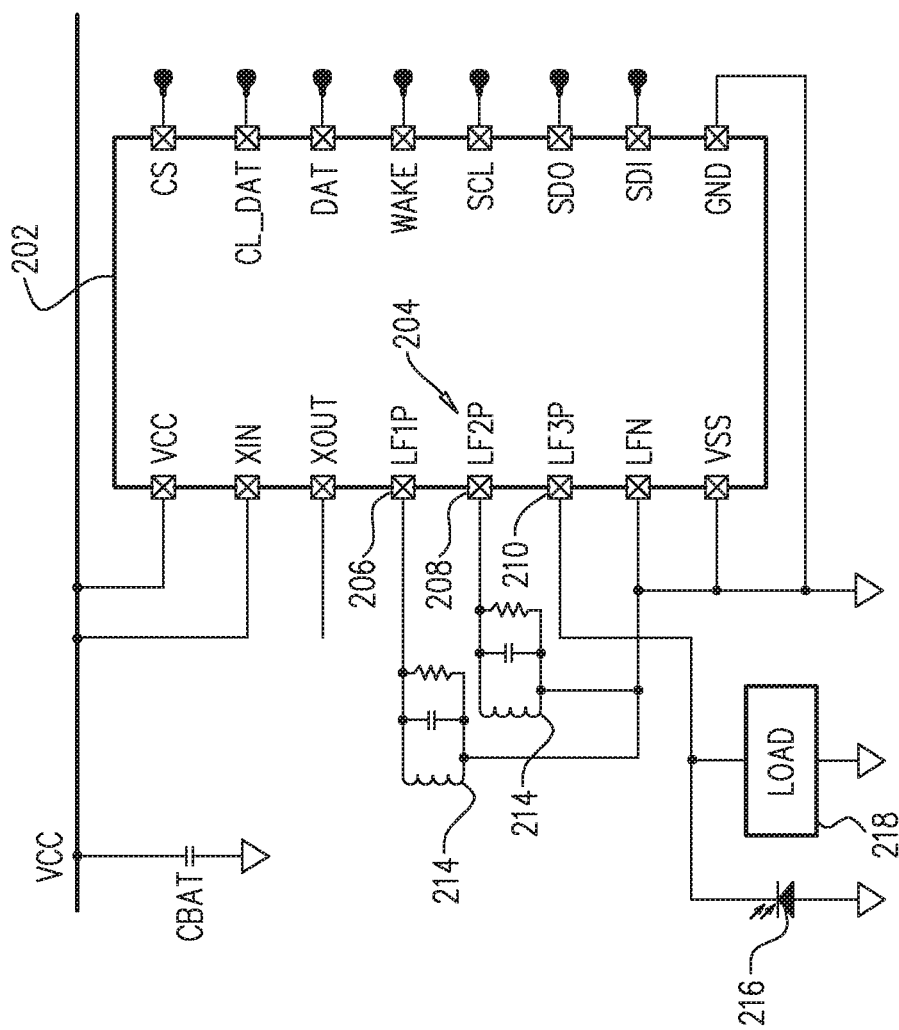
FIG. 2 is a simplified circuit diagram illustrating a preferred embodiment of a transponder receiver suitable for use in a transponder device of the type shown in FIG. 1.

Reference is now made to FIG. 2, which is a circuit diagram illustrating a preferred embodiment of a transponder receiver suitable for use in a transponder device of the type shown in FIG. 1.

As shown in FIG. 2, there is provided a receiver 202 having a plurality of input channels 204, here embodied, by way of example, as a first input channel 206, a second input channel 208 and a third input channel 210.

Receiver 202 is a particularly preferred embodiment of receiver 102 in transponder device 100 of FIG. 1 and may be configured and operable for receiving either LF 20 kHz-300 kHz input signals or HF 3 MHz-30 MHz input signals. It is appreciated that the input frequency range of receiver 202 preferably does not include an infra-red frequency range. Here, by way of example, receiver 202 is shown to be embodied as an LF receiver, for receiving LF radio frequency signals. It is appreciated, however, that receiver 202 may alternatively be embodied as an HF receiver.

LF receiving circuitry 214 is preferably associated with first and second input channels 206 and 208. Here, by way of example, LF receiving circuitry 214 is shown to be embodied as antennas, for receiving LF radio frequency signals from an LF transmitter, such as LF/HF beacon 112 of FIG. 1. It is appreciated that the particular structure of antennas 214 illustrated herein is exemplary only and that antennas 214 may be embodied as any type and/or number of antennas, coils and/or transponders capable of receiving incoming LF or HF radiation and generating a signal responsive thereto, which signal is provided to receiver 202 via channels 206 and 208.

LF receiver 202 further preferably includes infra-red (IR) frequency range receiving circuitry 216, to facilitate the receipt of infra-red signals thereby. It is a particular feature of a preferred embodiment of the present invention that infra-red receiving circuitry 216 is implemented on at least one channel of plurality of input channels 204 of LF receiver 202, thus advantageously allowing receiver 202 to act as a receiver for both LF and IR signals.

Here, by way of example, IR receiving circuitry 216 is seen to be implemented on a single channel, namely third channel 210, of plurality of input channels 204 of LF receiver 202. It is understood, however, that IR receiving circuitry 216 may be implemented on one or more than one input channel of receiver 202 in parallel with one or more LF signal input channels.

IR receiving circuitry 216 may be embodied as an IR photodiode 216. IR receiving circuitry 216 is preferably configured and operative to receive IR signals from an IR transmitter, such as IR beacon 118 of FIG. 1. Particularly preferably, IR signals transmitted by IR beacon 118 are frequency- or amplitude-modulated by at least one signal lying within the input frequency range of receiver 202. In the case of an LF receiver, such as LF receiver 202 shown in FIG. 2, IR signals transmitted by IR beacon 118 are preferably frequency- or amplitude-modulated by a signal lying in the LF range such as, by way of example, a 125 kHz signal.

IR photodiode 216 preferably receives the modulated IR signal and provides the modulated IR signal to receiver 202, through the at least one input channel, such as channel 210, upon which IR photodiode 216 is located. Preferably, IR photodiode 216 extracts IR data which has been directly modulated by the modulating signal and provides the extracted IR data to the receiver 202.

It is appreciated that direction of photodiode 216 shown in FIG. 2 is exemplary only and that photodiode 216 may alternatively be implemented in an opposite direction to that shown.

IR receiving circuitry 216 is preferably electrically connected to a load 218. Load 218 may be any resistive, capacitive and/or inductive electrical load. Load 218 preferably serves to convert the current output by IR photodiode 216 to voltage. Furthermore, load 218 is preferably functional to improve the signal quality of the output from photodiode 216.

Figure 3:
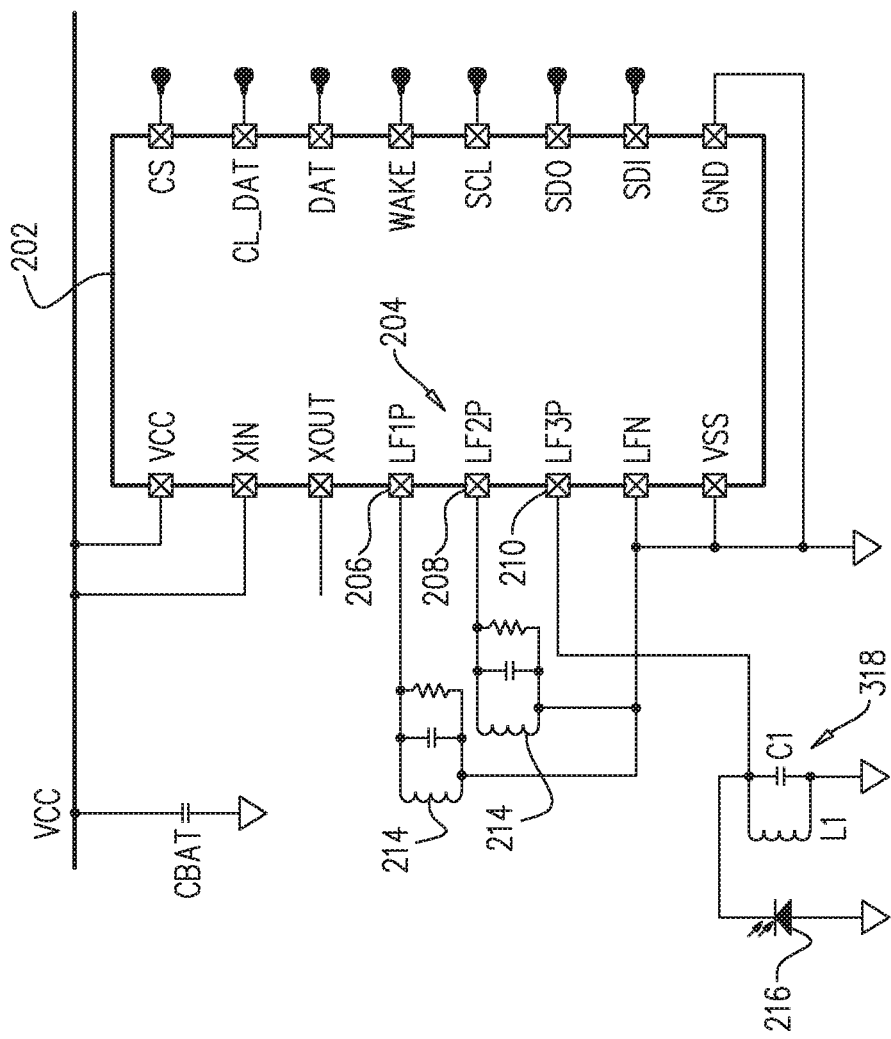
FIG. 3 is a simplified circuit diagram illustrating another preferred embodiment of a transponder receiver suitable for use in a transponder device of the type shown in FIG. 1.

A particularly preferred embodiment of load 218 is illustrated in FIG. 3, in which load 218 is seen to comprise a resonance circuit 318 formed by a capacitor C1 connected in parallel to an inductor L1. Capacitor C1 and inductor L1, in combination with capacitive elements of photodiode 216, preferably form a resonance circuit preferably having a resonant frequency close to or at the modulating frequency. Resonance circuit 318 preferably serves to increase the selectivity and sensitivity of the received signal and to convert the signal to a voltage receivable by receiver 202.

Figure 4:
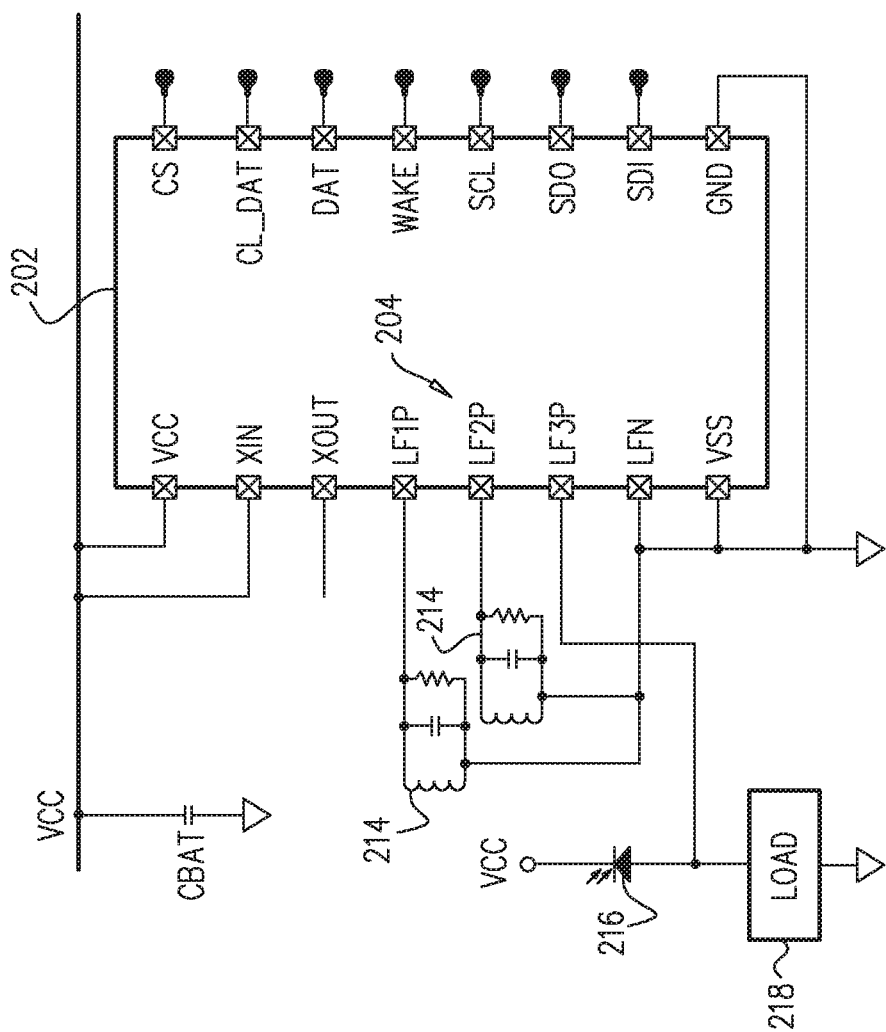
FIG. 4 is a simplified circuit diagram illustrating a further preferred embodiment of a transponder receiver suitable for use in a transponder device of the type shown in FIG. 1.

Load 218 may be connected in parallel to IR photodiode 216, as illustrated in FIGS. 2 and 3. Alternatively, load 218 may be connected in series with photodiode 216, as seen in the arrangement of load 218 with respect to photodiode 216 illustrated in FIG. 4. It is understood that IR receiving circuitry 216 is not limited to comprising a single photodiode and may comprise more than one photodiode connected in series and/or parallel to load 218.

Figure 5:
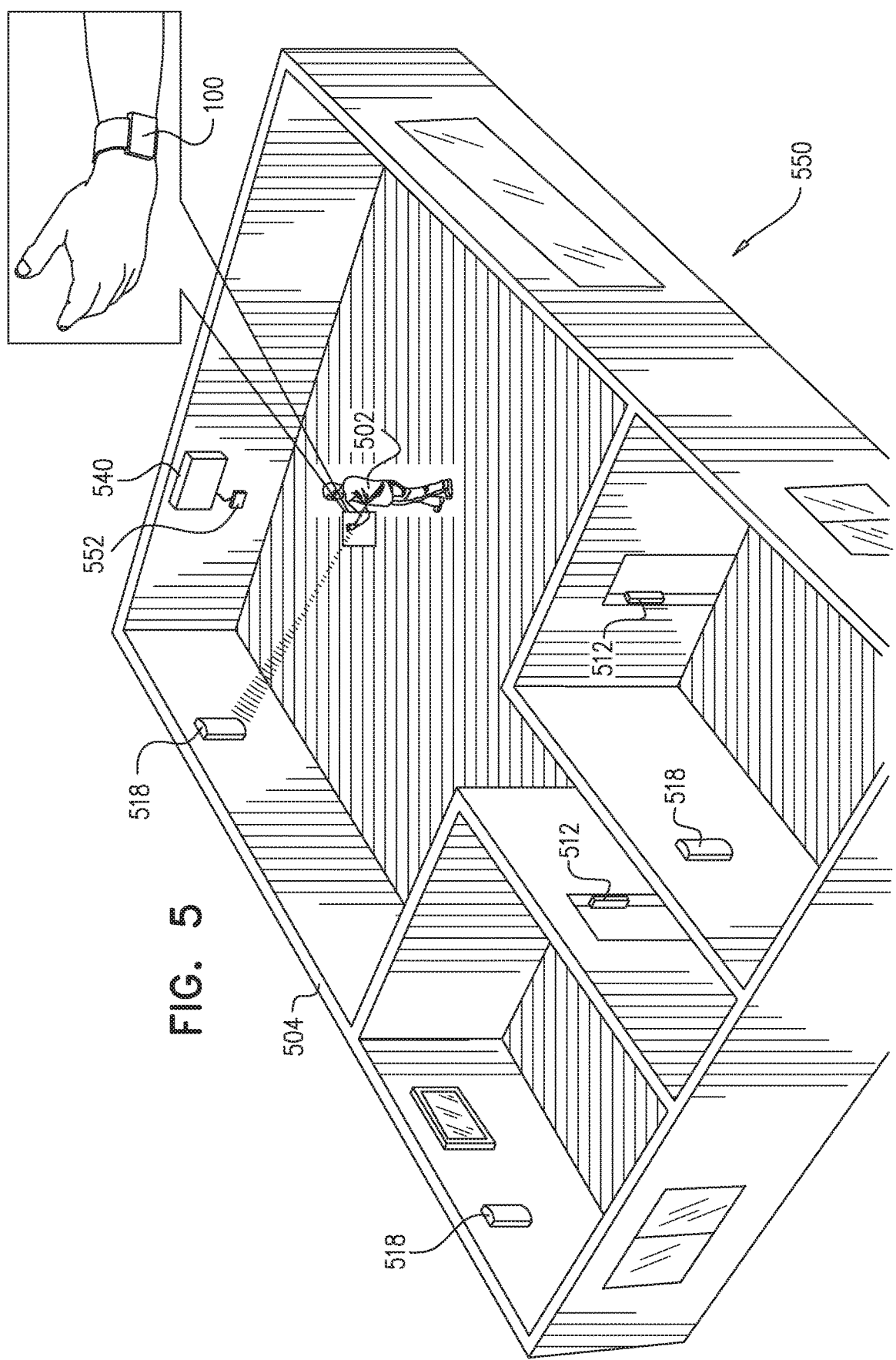
FIG. 5 is a pictorial representation of a preferred implementation of a system including a transponder device of the type shown in FIG. 1.

Reference is now made to FIG. 5, which is a pictorial representation of a preferred implementation of a system including a transponder device of the type shown in FIG. 1.

As seen in FIG. 5, portable transponder device 100 may be worn by an individual 502 located within a premises 504. Transponder device 100 may be embodied as a wrist tag, as illustrated here. Alternatively, transponder device 100 may be embodied as any type of entity tag including, but not limited to, an asset tag, personal badge, lone worker tag and baby tag. The location of individual 502 within premises 504 may be tracked by way of communication between transponder device 100 and at least one of a first multiplicity of LF or HF transmitters 512 and a second multiplicity of IR transmitters 518 distributed over premises 504.

Particularly, the room in which individual 502 is located may be detected by way of an IR link between IR transmitter 518 mounted in the room and IR receiving circuitry, such as IR receiving circuitry 116, 216 in transponder device 100. Furthermore, the passage of individual 502 through an exit within the premises may be detected by way of an LF or HF link between LF or HF transmitters 512 mounted at exits of premises 504 and the LF/HF receiving circuitry, such as LF/HF receiving circuitry 114, 214 in transponder device 100.

An RF transmitter, such as RF transmitter 130 in transponder device 100, may communicate with an external RF receiver 540, which RF receiver 540 is preferably centrally located on premises 504. RF transmitter 130 preferably transmits the ID of transponder device 100 together with the extracted ID of an IR and LF/HF transmitter in communication with transponder device 100 to RF receiver 540, in order to enable identification of the location of the transponder device 100 within premises 504.

It is understood that the location of LF/HF transmitters 512 and IR transmitters 518 illustrated in FIG. 5 is exemplary only and that LF/HF transmitters 512 and IR transmitters 518 may be mounted at a variety of locations on premises 504, including, for example, on a wall or ceiling.

It is appreciated that transponder device 100, in combination with LF/HF and IR transmitters 512, 518 and RF receiver 540 preferably forms a RTLS 550. It is understood that RTLS 550 need not necessarily include both first and second multiplicities of LF/HF transmitters 512 and IR transmitters 518, but rather may include any suitable combination thereof in accordance with system requirements. For example, RTLS 550 may include first multiplicity of LF/HF transmitters 512 in combination with transponder 100 and RF receiver 540, without IR transmitters 518, or may include second multiplicity of IR transmitters 518 in combination with transponder 100 and RF receiver 540, without LF/HF transmitters 512. It is further understood that RTLS 550 preferably also includes additional control and processing components, omitted here for the sake of clarity, as are well known in the art.

It is appreciated that, due to the implementation in the present invention of IR receiving circuitry on at least one input channel of the receiver in transponder device 100, transponder device 100 is capable of supporting both an IR and either LF or HF communication link using only a single receiver, thus allowing transponder device 100 to be formed in a highly compact, cost-effective manner. Furthermore, the receiver including IR and either LF or HF receiving circuitry in transponder device 100 is preferably in a constantly 'on' signal-receiving state, allowing continuous reception of IR and LF/HF signals.

As a result of the constant operation of IR and LF/HF receivers in transponder device 100, IR and LF/HF transmitters 518 and 512 may transmit only intermittently to transponder device 100, as described above with reference to FIG. 1, and thus consume less power than would be required to support continuous operation thereof. As appreciated from consideration of FIG. 5, IR transmitters 518 and LF/HF transmitters 512 may therefore be configured as wireless devices, powered by battery and thus conveniently installed in premises 504. As further appreciated from consideration of FIG. 5, the only component of RTLS 550 requiring a wired, mains power connection is preferably external RF receiver 540 having a mains power connection 552. RTLS 550 is thus particularly well-suited for easy and rapid deployment in a premises.

In the embodiment of RTLS 550 shown in FIG. 5, both multiplicities of IR transmitters 518 and LF/HF transmitters 512 are shown to be battery powered, without a mains power connections. However, it is appreciated, that one or both of IR and LF/HF transmitters 518 and 512 may alternatively be bus connected, depending on the installation requirements of RTLS 550.

It will be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. A portable transponder device comprising:
   a receiver having a plurality of signal input channels, wherein the receiver is configured for receiving, via the plurality of signal input channels, input signals in an input frequency range not including an infra-red frequency range;
   non-infra-red frequency range receiving circuitry implemented on a first signal input channel within the plurality of signal input channels of the receiver and configured for receiving a signal in said input frequency range not including said infra-red frequency range, wherein the non-infra-red frequency range receiving circuitry provides the signal to the receiver through the first signal input channel;
   infra-red frequency range receiving circuitry implemented on a second signal input channel within the plurality of signal input channels of the receiver and configured for receiving modulated infra-red frequency range signals modulated by a modulating signal having a modulating frequency in said input frequency range of the receiver, wherein the infra-red frequency range receiving circuitry extracts data which has been modulated by the modulating signal and provides the data to the receiver through the second signal input channel of the receiver; and
   a radio frequency (RF) transmitter configured to transmit beacon identifiers (IDs) extracted from signals received via the first signal input channel and the second signal input channel.

2. The portable transponder device according to claim 1, wherein said modulated infra-red frequency range signals are at least one of frequency modulated or amplitude modulated by said modulating signal in said input frequency range.

3. The portable transponder device according to claim 1, wherein said infra-red frequency range receiving circuitry comprises at least one photodiode.

4. The portable transponder device according to claim 3, and also comprising an electrical load connected to said at least one photodiode, wherein the electrical load is configured to convert a current output by the at least one photodiode to a voltage.

5. The portable transponder device according to claim 4, wherein said electrical load comprises a resonance circuit connected to said at least one photodiode, wherein the resonance circuit has a resonant frequency that is substantially equal to the modulating frequency of the modulating signal.

6. The portable transponder device according to claim 1, further comprising a battery, wherein said receiver is powered by said battery to be operative in a constantly on, signal-receiving state.

7. The portable transponder device according to claim 1, wherein the data comprises at least one of an identifier of an infra-red beacon from which the modulated infra-red frequency range signals have been received or an identifier that identifies an infra-red transmitter and a location thereof.

8. The portable transponder device according to claim 1, wherein the data is provided by the infra-red frequency range receiving circuitry to the receiver as a varying voltage.

9. The portable transponder device according to claim 1,
   wherein the non-infra-red frequency range receiving circuitry implemented on the first signal input channel of the receiver comprises a first antenna configured for receiving a first radio frequency beacon in the input frequency range not including the infra-red frequency range; and
   wherein the infra-red frequency range receiving circuitry implemented on the second signal input channel of the receiver comprises a resonance circuit configured for receiving an infra-red beacon, the resonance circuit having a resonant frequency that is substantially equal to the modulating frequency of the modulating signal.

10. The portable transponder device according to claim 9, further comprising:
    another non-infra-red frequency range receiving circuitry implemented on a third signal input channel within the plurality of signal input channels and configured for receiving another signal in said input frequency range not including said infra-red frequency range;
    wherein the another non-infra-red frequency range receiving circuitry provides the another signal to the receiver through the third signal input channel; and
    wherein the another non-infra-red frequency range receiving circuitry implemented on the third signal input channel of the receiver comprises a second antenna configured for receiving a second radio frequency beacon in the input frequency range not including the infra-red frequency range.

11. A real time location system comprising:
    a first multiplicity of transmitters located on a premises for transmitting signals in a transmission frequency range not including an infra-red frequency range;
    a second multiplicity of infra-red frequency range transmitters located on said premises for transmitting modulated infra-red frequency range signals modulated by a modulating signal having a modulating frequency in said transmission frequency range not including an infra-red frequency range; and
    at least one portable wireless transponder device associated with an entity located within said premises, said at least one portable wireless transponder device comprising:
      a receiver having a plurality of signal input channels, wherein the receiver is configured for receiving, via the plurality of signal input channels, input signals in said transmission frequency range not including an infra-red frequency range;
      non-infra-red frequency range receiving circuitry implemented on a first signal input channel within the plurality of signal input channels of the receiver and configured for receiving a signal in said transmission frequency range not including said infra-red frequency range, wherein the non-infra-red frequency range receiving circuitry provides the signal to the receiver through the first signal input channel;
      infra-red frequency range receiving circuitry implemented on a second signal input channel within the plurality of signal input channels of the receiver and configured for receiving said modulated infra-red frequency range signals transmitted by said second multiplicity of infra-red frequency range transmitters, wherein the infra-red frequency range receiving circuitry extracts data which has been modulated by the modulating signal and provides the data to the receiver via the second signal input channel of the receiver; and a radio frequency (RF) transmitter configured to transmit beacon identifiers (IDs) extracted from signals received via the first signal input channel and the second signal input channel.

12. The real time location system according to claim 11, wherein said modulated infra-red frequency range signals are at least one of frequency modulated or amplitude modulated by said modulating signal in said transmission frequency range.

13. The real time location system according to claim 11, wherein said infra-red frequency range receiving circuitry comprises at least one photodiode.

14. The real time location system according to claim 13, wherein the infra-red frequency range receiving circuitry further comprises an electrical load connected to said at least one photodiode, wherein the electrical load is configured to convert a current output by the at least one photodiode to a voltage.

15. The real time location system according to claim 14, wherein said electrical load comprises a resonance circuit connected to said at least one photodiode, wherein the resonance circuit has a resonant frequency that is substantially equal to the modulating frequency of the modulating signal.

16. The real time location system according to claim 11, wherein said at least one portable wireless transponder device further comprises a battery and wherein said receiver is powered by said battery to be operative in a constantly on, signal-receiving state.

17. The real time location system according to claim 16, wherein said first multiplicity of transmitters transmit intermittently.

18. The real time location system according to claim 17, wherein said first multiplicity of transmitters transmit every few milliseconds.

19. The real time location system according to claim 17, wherein said first multiplicity of transmitters are battery powered.

20. The real time location system according to claim 16, wherein said second multiplicity of infra-red frequency range transmitters transmit intermittently.

21. The real time location system according to claim 20, wherein said second multiplicity of infra-red frequency range transmitters transmit every few seconds.

22. The real time location system according to claim 20, wherein said second multiplicity of infra-red frequency range transmitters are battery powered.

23. A method for receipt of signals by a receiver in a portable transponder device, the receiver having a plurality of signal input channels configured for receiving input signals in an input frequency range not including an infra-red frequency range, comprising:

receiving, by non-infra-red frequency range receiving circuitry implemented on a first signal input channel within the plurality of signal input channels of the receiver, a signal in said input frequency range not including said infra-red frequency range, wherein the non-infra-red frequency range receiving circuitry provides the signal to the receiver through the first signal input channel;

receiving, by infra-red frequency range receiving circuitry implemented on a second signal input channel within the plurality of signal input channels of the receiver, modulated infra-red frequency range signals modulated by a modulating signal having a modulating frequency in said input frequency range;

extracting, by the infra-red frequency range receiving circuitry, data which has been modulated by the modulating signal;

providing the data to said receiver through the second signal input channel of said receiver; and transmitting, by a radio frequency (RF) transmitter of the portable transponder device, beacon identifiers (IDs) extracted from the signals received via the first signal input channel and the second signal input channel.

24. The method according to claim 23, wherein said receiving by said non-infra-red frequency range receiving circuitry and said receiving by said infra-red frequency range receiving circuitry are performed continuously.

* * * * *

UNITED STATES PATENT AND TRADEMARK OFFICE
CERTIFICATE OF CORRECTION

PATENT NO. : 10,749,607 B2  
APPLICATION NO. : 15/642596  
DATED : August 18, 2020  
INVENTOR(S) : Avi Manela Page 1 of 1

It is certified that error appears in the above-identified patent and that said Letters Patent is hereby corrected as shown below:

In the Specification

In Column 2, Line 60, delete "FIG. 1:" and insert -- FIG. 1; --, therefor.
In Column 3, Line 16, delete "100X) is" and insert -- 100 is --, therefor.
In Column 7, Line 5, delete "FIG. 2. IR" and insert -- FIG. 2, IR --, therefor.

Signed and Sealed this  
Twenty-second Day of December, 2020

Andrei Iancu  
*Director of the United States Patent and Trademark Office*